3,113,147
METHOD FOR THE PREPARATION OF CYANOSTYRENE
David S. Hoffenberg, Stamford, Conn., assignor to American Cyanamid Company, New York, N.Y., a corporation of Maine
No Drawing. Filed Dec. 2, 1960, Ser. No. 73,170
5 Claims. (Cl. 260—465)

This invention relates to a new process for preparing ar-cyanostyrenes. More specifically, this invention relates to the preparation of an ar-cyanostyrene by reacting ar-alkyl styrenes with nitric oxide in the presence of a dehydration-dehydrogenation catalyst. Still more particularly, this invention relates to a process for the preparation of an ar-cyanostyrene by reacting ar-alkyl styrenes with nitric oxide in the presence of a dehydration-dehydrogenation catalyst at a temperature of from 400 to 700° C. The processes known in the prior art for the preparation of cyanostyrenes have been characterized by various substantial disadvantages such as excessive carbonation, excessive by-product formation, high cost of starting materials and complicated reactions. The present invention provides a method for the preparation of cyanostyrene by an inexpensive, simple and industrially feasible method.

The object of the present invention is to provide a new and improved process for the preparation of cyanostyrenes which will be free from the disadvantages mentioned above. This and other objects of the present invention will be discussed in greater detail hereinbelow.

The present invention is a process for the preparation of an ar-cyanostyrene which comprises reacting nitric oxide with various ar-alkyl styrenes wherein the alkyl group contains from 1 to 4 carbon atoms. Isomers of these ar-alkyl styrenes or mixtures thereof may also be used. The reaction is carried out at a temperature of from about 400° to about 700° C. in the presence of a dehydration-dehydrogenation catalyst. The reaction is relatively clean and the reaction product can be broken down into unreacted starting material, cyanostyrene, a small amount of carbon or carbon dioxide and a trace of residue.

The process is carried out by passing gaseous streams of the ar-alkyl styrene feed material and the nitric oxide over the catalyst bed. The catalyst in the reaction vessel can be in the form of a fixed bed or in the form of a fluidized bed. When a fixed bed of catalyst is utilized the gaseous feed materials are fed downwardly over the catalyst, however, when a fluid bed of catalyst is employed the feed materials are fed in gaseous form upwardly through the catalyst bed. The effluent is condensed out, recovered and weighed. The ar-cyanostyrene is isolated by first removing the water, utilizing any known method, e.g., settling decanting, and thereafter distilling the remaining organic material. When the fluid bed system discussed above is utilized, the extreme exotherm, which sometimes occurs in the fixed bed system, is reduced to a minimum.

Among the prior art processes which have been set forth in various publications are the following:

(A) British Patent 571,829 (1945) prepares cyanostyrene by first chlorinating ortho-cyanoethylbenzene using ultraviolet light at temperatures of about 70 to 120° C. The beta-chloro-(ortho-cyano)ethylbenzene is then pyrolyzed at reduced pressure of about 180 to 250 mm. at 570 to 590° C. to form the desired cyanostyrene.

(B) Marvel in the Journal of American Chemical Society, volume 67, page 2250, 1945, discloses the preparation of cyanostyrene by treating p-bromophenylmagnesium bromide with acetaldehyde to form 1-hydroxy, 1(p-bromo phenyl)ethane. The ethane compound is then reacted with cuprous cyanide to form 1-hydroxy, 1(p-cyanophenyl)ethane. The cyanophenyl ethane compound is then treated with potassium hydrogen sulfate in the liquid phase to produce the desired cyanostyrene.

(C) In volume 68, page 722, of the Journal of American Chemical Society, Overberger et al. discuss the preparation of cyanostyrene by treating 1-hydroxy, 1(p-cyanophenyl)ethane with acetic anhydride to form the compound 1-acetoxy, 1(p-cyanophenyl)ethane which is then dropped on hot glass beads to form the corresponding para-cyanostyrene.

(D) Mowry et al. in the Journal of American Chemical Society, volume 68, pages 1105 to 1109, 1946, treat the same starting material as Overberger et al. in vapor phase and in the presence of alumina as a catalyst to thereby form the cyanostyrene.

(E) Cyanostyrene can also be formed by treating p-cyano cinnamic acid in the presence of quinoline and a copper catalyst.

(F) In another method, 1,1-diphenylethane is treated with iodine and a silver sulfate-sulfuric acid catalyst to produce 1-phenyl-1(p-iodophenyl)ethane. This iodo compound is then treated with cuprous cyanide in the presence of pyridine to form the compound 1-phenyl-1(p-cyanophenyl)ethane which is then cracked to yield cyanostyrene.

It can be seen that all of the above preparative methods would offer no commercial attraction because of their complexity or because of the difficulty in obtaining starting materials. The instant invention obviates all these disadvantages and those mentioned above and presents an attractive commercial method for the production of cyanostyrene.

In the United States Patent No. 2,736,739 to D. C. England et al. for Preparation of Nitriles, there is disclosed a method for the preparation of nitriles utilizing an alkyl substituted aromatic compound having at least one alkyl group directly attached to an aromatic carbon atom by reacting said aromatic compound with nitric oxide at temperatures between 400 and 700° C. in the presence of a dehydrogenation catalyst. The present invention provides a new and unexpected process over that disclosed by England et al. as can be seen from the following discussion. It is known that toluene, when reacted with nitric oxide, under the conditions stated above, results in the formation of benzonitrile. It is also known that when xylenes are reacted with nitric oxide, terephthalonitrile is produced. Likewise, when ethylbenzene or propylbenzene is reacted with nitric oxide the carbon atoms above methyl are oxidized off and benzonitrile is again produced. It is known that when a material such as 1-methyl-2-ethyl-benzene is reacted with nitric oxide the result is again the preparation of terephthalonitrile. It can be seen therefore that it was entirely surprising and unexpected that when a material such as a ring-substituted methylstyrene was reacted with nitric oxide that the vinyl group would not be attacked by the nitric oxide and an ar-cyanostyrene would be produced. One skilled in the art would expect the vinyl group to react with the nitric oxide in the same way that the alkyl groups so react. In other words, one would expect terephthalonitrile to be produced. Applicant has discovered, however, as mentioned above, that the vinyl group possesses some sort of unexplained and unexpected stability which prevents it from being attacked by the nitric oxide and thereby being oxidized to a nitrile group.

It can be seen therefore, that the present invention provides a new and novel process for the preparation of an ar-cyanostyrene over any of the methods of the prior art, set forth hereinabove.

The following examples are by way of illustration only and are by no means meant to be construed as limitations on the instant invention. All parts and percentages are by weight unless otherwise indicated.

EXAMPLE 1

59 parts per hour of a mixture o- and p-methylstyrene is metered into a vaporizer wherein it is mixed with 22.5 parts per hour of nitric oxide. The nitric oxide is diluted with 35 parts of nitrogen. The gaseous mixture is then led over a bed of 100 parts of a silver-on-silica gel catalyst at a temperature of 500° C. The molar ratio of nitric oxide to the methylstyrene mixture to diluent is 3:1:5. A total of 352 parts of methylstyrene mixture is fed to the reactor. The effluent is recovered from the catalyst-containing reactor by passing it through condensers in which the liquid products are condensed out. These liquid products are then weighed and transferred to a suitable separation vessel wherein the water is removed from the remaining organic liquid products. The organic material remaining is then distilled in a distillation column under reduced pressure. The distillation results in the recovery of 225 parts of unreacted ar-methylstyrene, 5 parts of residue and 9 parts of cyanostyrene. This recovery of ar-cyanostyrene constitutes a conversion of 36% of the methylstyerene mixture and a yield of 6.5% of ar-cyanostyrene, based on the methylstyrene consumed.

The following table shows numerous other examples setting forth various modifications of the instant process.

EXAMPLE 17

Same procedure of Example 1 is again followed but p-n-butylstyrene is substituted for the o- and p-methylstyrene. A reasonable yield of p-cyanostyrene is recovered.

The catalysts mentioned in the examples set forth hereinabove were prepared essentially as follows. The silver-on-silica gel catalyst is prepared essentially as described in U.S. Patent No. 2,736,739. 2,000 parts of 6–8 mesh silica gel was steamed for several hours on a steam bath to wet the silica gel without completely fracturing to fine particles. The saturated silica gel was added to a solution of 100 parts of silver nitrate in 2000 parts of distilled water. After boiling for one hour, the mixture was cooled to room temperature. To this cooled mixture was slowly and successively added, with swirling, 120 parts of 28% ammonia solution and 2000 parts of 0.8 N sodium hydroxide. A reducing solution was prepared by dissolving 160 parts of cane sugar in 800 parts of water, adding 100 parts of ethyl alcohol and 7 parts of nitric acid and boiling the resulting solution for 5 minutes. The cooled reducing solution (240 parts) was rapidly added to the mixture of silica gel and silver salt solution. The resulting mixture was allowed to stand for several hours on a steam bath with occasional shaking. The color gradually darkened, becoming black at the end. It was then washed several times by decantation with distilled water and finally filtered and air dried.

The lead acetate-on-silica gel catalyst was prepared essentially as described in U.S. Patent 2,386,586. 3,000 parts of Davidson dessicant grade silica gel (6–8 mesh) was steamed for several hours. This procedure prevented fracturing of the silica gel when contacted with water. The saturated silica gel was then slowly added to a suitable vessel containing a solution of 360 parts of lead oxide in 1100 parts of 33% acetic acid. After warming on a steam bath for several hours, the contents of the vessel are evaporated to dryness in a heated dessicator under reduced pressure. The catalyst was then calcined overnight at 375° C.

Although the above-mentioned catalyst systems are those which are preferred in the instant invention, satisfactory results can be obtained by the use of any catalyst which is known to promote a dehydration-dehydrogena-

*Table 1*

| Example No. | Hourly Molar Feed Rates | | | | Molar Ratio of Feeds, NO/MS/Diluent | Catalyst | | Temperature Initial, ° C. | Parts MS Fed | Isolated Product, Cyanostyrene (parts) | Conv. of MS, Percent | Yield, Percent |
|---|---|---|---|---|---|---|---|---|---|---|---|---|
| | MS | NO | N₂ | Steam | | Type | Parts | | | | | |
| 2 | 0.25 | 1.0 | 1.25 | 0 | 4/1/5 | Ag. on Si gel | 100 | 400 | 174 | 5 | 26 | 10 |
| 3 | 0.25 | 1.0 | 1.25 | 0 | 4/1/5 | ---do--- | 40 | 450 | 177 | 5 | 20 | 10 |
| 4 | 0.25 | 1.0 | 1.25 | 0 | 4/1/5 | ---do--- | 40 | 435 | 177 | 1 | 19 | 2.5 |
| 5 | 0.25 | 1.0 | 1.25 | 0 | 4/1/5 | ---do--- | 40 | 450 | 177 | 1 | 18 | 3 |
| 6 | 0.25 | 1.0 | 0 | 0 | 4/1/0 | ---do--- | 40 | 450 | 177 | 4 | 19 | 11 |
| 7 | 0.25 | 1.0 | 0 | 0 | 4/1/0 | ---do--- | 40 | 510 | 177 | 2 | 9 | 12 |
| 8 | 0.25 | 1.0 | 0 | 0 | 4/1/0 | Lead Acetate on Si gel. | 40 | 475 | 118 | 5 | 26 | 15 |
| 9 | 0.25 | 0.50 | 0.75 | 0 | 2/1/3 | ---do--- | 100 | 450 | 60 | 6 | 33 | 27 |
| 10 | 0.50 | 1.0 | 0 | 0 | 2/1/0 | ---do--- | 130 | 500 | 177 | 12 | 22 | 28 |
| 11 | 0.50 | 1.0 | 0 | 0 | 2/1/0 | ---do--- | 130 | 475 | 177 | 8 | 21 | 20 |
| 12 | 0.50 | 1.0 | 0 | 0 | 2/1/0 | ---do--- | 130 | 580 | 177 | 9 | 21 | 22 |
| 13 | 0.50 | 1.0 | 0 | 1.0 | 2/1/2 | ---do--- | 130 | 475 | 118 | 5 | 19 | 20 |
| 14 | 0.40 | 0.50 | 0 | 1.2 | 1.2/1/3 | ---do--- | 50 | 460 | 230 | 3 | 24 | 12 |

EXAMPLE 15

The same procedure as in Example 1 is utilized except that p-ethylstyrene is substituted in place of the o- and p-methylstyrene. After passing the gases over the catalyst and isolating the product, a yield of 10% of p-cyanostyrene is recovered.

EXAMPLE 16

The same procedure as in Example 1 is again followed except that m-isopropylstyrene is used in place of the o- and p-methylstyrene. Again a satisfactory yield of m-cyanostyrene is recovered.

tion reaction. Examples of such known catalysts are silver, iron, tin, cadmium, platinum, paladium and the like extended or unextended on such carriers as charcoal, pumice, keiselguhr, fuller's earth, alumina, thoria and the like. The preferred catalysts, however, are used because of their stability and effectiveness. The amount of catalyst used depends upon the starting material. However, from about 40 to about 130 volume and preferably 60 to 100 volume of catalyst per part of m-styrene per hour is the amount generally used. The catalyst particles have a mesh size of from about 8 to about 14.

As mentioned above, except for the formation of trace amounts of residue, the major sources of loss of yield appear to be from the formation of coke on the catalyst and the formation of carbon dioxide. Applicant has found that the carbon production can be substantially reduced by the use of an inert diluent mixed with the nitric oxide in the ar-alkylstyrene reaction. These inert diluents which are used are either nitrogen, water vapor or carbon dioxide. The table set forth hereinbelow shows that the carbon formation on the catalyst is reduced by the use of diluents during the reaction.

*Table II*

DEPOSITION OF CARBON ON CATALYST [1]

| Diluent | Temp., °C. | Total Moles MS Fed | Mol Ratio, NO/MS | Carbon on Cat., g. |
|---|---|---|---|---|
| None | 475 | 1.5 | 2/1 | 14 |
| $N_2$ (50%) | 460 | 1.5 | 2/1 | 7 |
| $H_2O$ (50%) | 460 | 1.5 | 0/1 | 3 |
| $H_2O$ (50%) | 475 | 2.5 | 2/1 | 1 |

[1] 100 volumes of lead acetate-on-silica gel catalyst per part of methyl styrene per hour.

After the catalysts have been used for a substantial period of time, they may be regenerated by treating them with air at a temperature of about 400 to 700° C. for at least 2 hours. The regenerated catalyst may then be utilized once again in the production of ar-cyanostyrenes.

The molar ratio of nitric oxide to ar-alkyl-styrene utilizable in the instant invention is in the range of from about 4.1 to 1:1 moles per hour while the molar ratio of ar-alkylstyrene to diluent utilizable is in the range of from about 1:0 to 1:5 moles per hour. It is obvious that the actual mole ratio of these components used in the process depends somewhat upon the particular compound, i.e., ar-alkylstyrene being reacted. As can be seen from Table I set forth above, the mole ratios are somewhat varied and anyone skilled in the art can utilize the data set forth herein to obtain the desired amounts of said materials to produce the optimum amount of cyanostyrene.

The reaction of this invention, as mentioned above, is operable at temperatures in the range of 400° C. to 700° C. However, as can be seen from Table I above, the best results are obtained utilizing a temperature of from about 435° C. to about 580° C. The temperature utilized depends somewhat upon the catalyst which is employed and therefore temperatures from 435° C. to 510° C. give the best results with silver-on-silica gel and temperatures of from 450 to 580° C. give the best results with lead acetate-on-silica gel.

Space velocity is not a critical condition in the instant process and may be varied over wide ranges without appreciably affecting the reaction. Thus it can be seen that space velocity as low as 15 hours$^{-1}$ or as high as 2500 hours$^{-1}$ may be used without substantial variation in the yield of ar-cyanostyrene. Lower space velocities are preferably employed with feed streams having low nitric oxide concentrations and high space velocities should be employed with feed streams having high nitric oxide concentrations. These space velocities are obviously used to prevent loss in yield from over-oxidation.

As mentioned above, the preferred starting materials are the ar-alkylstyrenes wherein the alkyl group contains 1 to carbon 4 carbon atoms. The ar-alkylstrenes have the formula

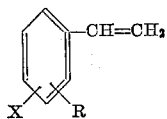

wherein R is selected from the group consisting of methyl, ethyl, isopropyl, n-propyl, n-butyl and isobutyl radicals and X is an inert substituent. Examples of these inert substituents are hydrogen, halo, cyano, nitro and the like. By "inert substituent" is meant any substituent which is inert during the reaction i.e. will not react in any way during the treatment thereof with the nitric oxide.

Compounds which are included in this group are ortho, meta, and para-methylstyrene, ortho, meta and para-ethylstyrene, ortho, meta and para-isopropylstyrene, ortho, meta and para-n-propylstyrene, ortho, meta and para-n-butylstyrene, ortho, meta and para-isobutylstyrene. Also various arylhalo-arylalkylstyrenes such as 2-methyl-3-chlorostyrene, 2 - methyl - 3 - bromostyrene, 2-ethyl-3-iodostyrene, 2-ethyl-3-fluorostyrene, 2-ethyl-4-chlorostyrene, 2-methyl-4-bromostyrene, 2-n-propyl-4-iodostyrene, 2-n-propyl-4-fluorostyrene, 2-isopropyl-5-chlorostyrene, 2-isopropyl-5-bromostyrene, 2-n-butyl-5-iodostyrene, 2-n-butyl-5-fluorostyrene, 2-n-butyl-6-chlorostyrene, 2-ethyl-6-fluorostyrene, 2-methyl-6-bromostyrene, 2-n-butyl-6-iodostyrene, 3-propyl-4-chlorostyrene, 3-isobutyl - 4 - bromostyrene, 3-isopropyl-4-iodostyrene, 3-methyl-4-fluorostyrene, 3-ethyl - 5 - chlorostyrene, 3-n-propyl-5-bromostyrene, 3-n-butyl-5-iodostyrene, 3-isopropyl-5-fluorostyrene, 3-isobutyl-6-chlorostyrene, 3-ethyl-6-bromostyrene, 3-methyl-6-iodostyrene, 3-isobutyl-6-fluorostyrene, 4-isopropyl-5-chlorostyrene, 4-ethyl-5-bromostyrene, 4-n-propyl-5-iodostyrene, 4-n-butyl-5-fluorostyrene, 4-ethyl-6-chlorostyrene, 4-isopropyl-6-bromostyrene, 4-n-butyl-6-iodostyrene, 4-methyl-6-fluorostyrene, 4-isobutyl-2-chlorostyrene, 4-n-butyl-3-chlorostyrene, 3-methyl-2-chlorostyrene and the like.

Other compounds which can be utilized are the arylalkyl-arylcyanostyrenes. These compounds are similar to those halogenated compounds mentioned above except that a cyano group is substituted for the halo group. These compounds include 2-cyano-3-methylstyrene, 2-cyano-3-ethylstyrene, 3-cyano-4-n-propylstyrene, 3-cyano-4-isopropylstyrene, 3-cyano-5-n-butylstyrene, 3-cyano-5-isobutylstyrene and the like.

The nitro compounds utilizable as feed materials in the instant invention are similar to those mentioned above wherein the halo or cyano group have been replaced by a nitro group. These compounds include 2-nitro-3-methylstyrene, 2-nitro-3-ethylstyrene, 2-nitro-4-n-propylstyrene, 2-nitro-4-isopropylstyrene, 2-nitro-5-n-butylstyrene, 2-nitro-5-isobutylstyrene, 3-nitro-4-methylstyrene, 3-nitro-4-butylstyrene, 4-nitro-5-ethylstyrene and the like. Isomers of these compounds and mixtures thereof can also be used. Thus it can be seen that when a gas comprising ar-methylstyrene and ar-isobutylstyrene is fed into the reactor, under the conditions set forth hereinabove as critical, the product will still be an ar-cyanostyrene and no substantial reduction in yield thereof results.

The process of this invention is a continuous vapor phase reaction and any of the unreacted ar-alkylstyrenes which are recovered in the separation step may be recycled with fresh reactants without substantial decrease in the yield of ar-cyanostyrene and with a greater over all efficiency of the process as a whole.

The ar-cyanostyrene which is prepared by the instant process provides a valuable monomer for plastic materials. Not only may polycyanostyrene itself prove useful, but it provides a monomer with a versatile reactive group. The cyano group can be hydrolyzed to an amide or to an acid either before or after polymerization. It can be reduced to an amine or can be reacted with various other materials such as alcohols and amines to produce various monomers and polymers. In addition, the reactivity of the vinyl group for reactions other than polymerization makes this compound an extremely useful and versatile intermediate.

Various patents disclose the great utility of cyanostyrene polymers and copolymers. Among those patents are the British Patent 571,892 to Wingfoot Corporation, April 1943, mentioned above, and U.S. Patent No. 2,512,660, 1950, issued to Phillips Petroleum Company.

It will be appreciated that many modifications of the

I claim:
1. A method for the preparation of an ar-cyanostyrene which comprises reacting nitric oxide with a substituted styrene compound of the formula

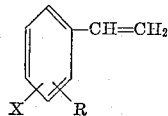

wherein R is an alkyl radical selected from the group consisting of methyl, ethyl, n-propyl, isopropyl, n-butyl and isobutyl radicals and X is selected from the group consisting of hydrogen, halogen, cyano and nitro radicals, at a temperature ranging from about 400° C. to about 700° C. and in the presence of a catalyst selected from the group consisting of silver-on-silica gel and lead acetate-on-silica gel.

2. A method for the preparation of an ar-cyanostyrene which comprises reacting nitric oxide with methylstyrene at a temperature ranging from about 400° C. to about 700° C. and in the presence of a catalyst selected from the group consisting of silver-on-silica gel and lead acetate-on-silica gel.

3. A method for the preparation of p-cyanostyrene which comprises reacting nitric oxide with p-methylstyrene at a temperature ranging from about 400° C. to about 700° C. and in the presence of a catalyst consisting essentially of lead acetate-on-silica gel.

4. A method according to claim 1 wherein the reaction is carried out in the presence of an inert diluent.

5. A method according to claim 4 wherein the inert diluent is selected from the class consisting of nitrogen, water vapor and carbon dioxide.

References Cited in the file of this patent
UNITED STATES PATENTS
2,736,739    England et al. _____ Feb. 28, 1956